(12) United States Patent
Dyos

(10) Patent No.: US 11,306,006 B2
(45) Date of Patent: Apr. 19, 2022

(54) WATER PURIFICATION SYSTEM WITH A CENTRIFUGAL SYSTEM AND A FRICTIONAL HEATER SYSTEM

(71) Applicant: Water Now Inc, Fort Worth, TX (US)

(72) Inventor: Mark Dyos, Weatherford, TX (US)

(73) Assignee: WATER NOW, INC., Fort Worth, TX (US)

( * ) Notice: Subject to any disclaimer, the term of this patent is extended or adjusted under 35 U.S.C. 154(b) by 0 days.

(21) Appl. No.: 15/819,056

(22) Filed: Nov. 21, 2017

(65) Prior Publication Data
US 2018/0265378 A1 Sep. 20, 2018

Related U.S. Application Data

(60) Provisional application No. 62/472,246, filed on Mar. 16, 2017.

(51) Int. Cl.
*C02F 1/16* (2006.01)
*B01D 21/26* (2006.01)
(Continued)

(52) U.S. Cl.
CPC .............. *C02F 1/16* (2013.01); *B01D 1/0011* (2013.01); *B01D 1/0058* (2013.01); *B01D 5/006* (2013.01);
(Continued)

(58) Field of Classification Search
CPC ........ B01D 1/222; B01D 1/223; B01D 1/225; B01D 1/226; B01D 1/228; B01D 1/0011; B01D 21/26; B01D 21/262; B01D 21/265; B01D 21/267; F22B 3/06; C02F 1/04–18; C02F 1/38; C02F 1/385; F04D 1/12; B04B 1/00; B04B 1/02; B04B 1/04; B04B 1/06; B04B 1/08; B04B 1/10; B04B 1/12; B04B 1/14; B04B 1/16; B04B 1/18; B04B 1/20; B04B 2001/2025; B04B 2001/2033; B04B 2001/2041; B04B 2001/205; B04B 2001/2058; B04B 2001/2066; B04B 2001/2075; B04B 2001/2083;
(Continued)

(56) References Cited

U.S. PATENT DOCUMENTS 3,180,268 A * 4/1965 Willis ........................ F04D 1/12
417/406
4,036,427 A * 7/1977 Erickson ................... B04B 1/00
415/89

(Continued)

*Primary Examiner* — Jonathan Luke Pilcher
(74) *Attorney, Agent, or Firm* — David G. Henry, Sr.; Alexander B. Uber

(57) ABSTRACT

A water purification system with a centrifugal system and a frictional heating system consists of a centrifugal unit, a cavitation unit, a cooling condenser, a vertical shaft, and a pitot tube. The centrifugal unit and the cavitation unit are mounted along the vertical shaft so that the rotational movement of the vertical shaft is transferred onto the centrifugal unit and the cavitation unit. Non-potable water is directed into the centrifugal unit to separate heavy solids. Less populated water from the centrifugal unit is transferred to the cavitation unit via the pitot tube. The cavitation unit uses friction to generate phase change in the volume of less populated water which is then directed to the cooling condenser to produce potable water.

9 Claims, 6 Drawing Sheets

(51) Int. Cl.
  *F22B 3/06* (2006.01)
  *B01D 1/00* (2006.01)
  *B01D 5/00* (2006.01)
  *C02F 1/38* (2006.01)

(52) U.S. Cl.
  CPC .............. *B01D 21/262* (2013.01); *C02F 1/38* (2013.01); *F22B 3/06* (2013.01)

(58) Field of Classification Search
  CPC . B04B 2001/2091; B04B 11/00; B04B 11/02; B04B 11/04; B04B 11/043; B04B 11/05; B04B 11/06; B04B 11/08; B04B 11/082; B04B 2011/046; B04B 2011/084; B04B 2011/086; B04B 2011/088
  See application file for complete search history.

(56) References Cited

U.S. PATENT DOCUMENTS

| | | | | |
|---|---|---|---|---|
| 4,287,026 A * | 9/1981 | Wallace | ................... | B01D 3/22 203/10 |
| 4,664,068 A * | 5/1987 | Kretchmar | ................ | C02F 1/04 122/26 |
| 2012/0267232 A1* | 10/2012 | Riley | ..................... | B01D 1/225 203/11 |

* cited by examiner

WATER PURIFICATION SYSTEM WITH A CENTRIFUGAL SYSTEM AND A FRICTIONAL HEATER SYSTEM

The current application claims a priority to the U.S. Provisional Patent application Ser. No. 62/472,246 filed on Mar. 16, 2017.

FIELD OF THE INVENTION

The present invention relates generally to a rotational water purification system that utilizes a centrifugal system and a cavitation frictional heater driven by a mutual vertical shaft.

BACKGROUND OF THE INVENTION

Current water purification means typically require disposable filters and membranes coupled with a heating element driven through a resistive coil that can fail especially if coming in contact with the fluids involved.

The cost of installing and the cost of maintaining a majority of the existing water purification systems is a significant disadvantage to the user. When installed, a majority of the existing water purification systems consume a high amount of power and purifies water at a slower rate than preferred. Thus, the overall benefit to the user is limited. The objective of the present invention is to introduce a water purification system that addresses the aforementioned issues.

The present invention seeks to mitigate inefficiencies of existing water purification systems by utilizing a water pump fed rotational centrifugal system for producing solid-contaminant free water, where the centrifuged solid contaminant is held to the interior cylindrical walls of the centrifuge and a pitot tube syphons the contaminate free water down into a frictional heater below the centrifuge and operating on the same rotational torque bestowed to the shaft. The friction heater uses frictional cavitation to produce a phase change in the water, resulting in water vapor or steam that further purifies the fluid, and either during or proceeding complete cavitation of the water the apparatus would syphon the water vapor into a cooling coil to expedite natural condensation and deposit the now potable water into an appropriate extraneous vessel.

DETAIL DESCRIPTIONS OF THE INVENTION

All illustrations of the drawings are for the purpose of describing selected versions of the present invention and are not intended to limit the scope of the present invention.

The present invention is a water purification system that utilizes a centrifugal system along with a cavitation frictional heater. By utilizing the present invention, non-potable water is cleaned and converted into purified water by means of a centrifuging mechanism and a dynamic heater. The process utilized in the present invention eliminates the need to use filters or other membranes to convert non-potable water into potable water.

Figure 1:
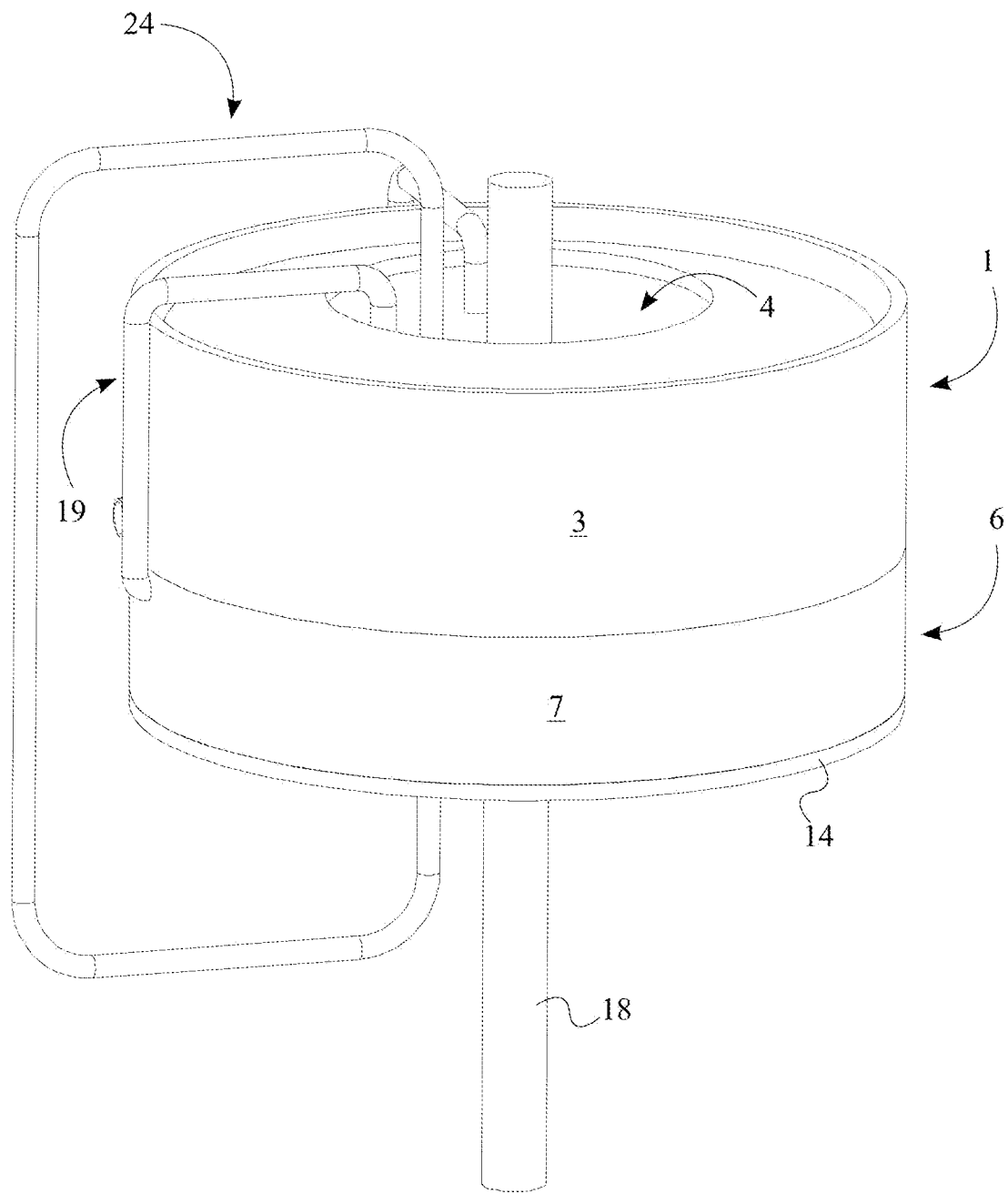
FIG. 1 is a perspective view of the present invention.
Figure 2:
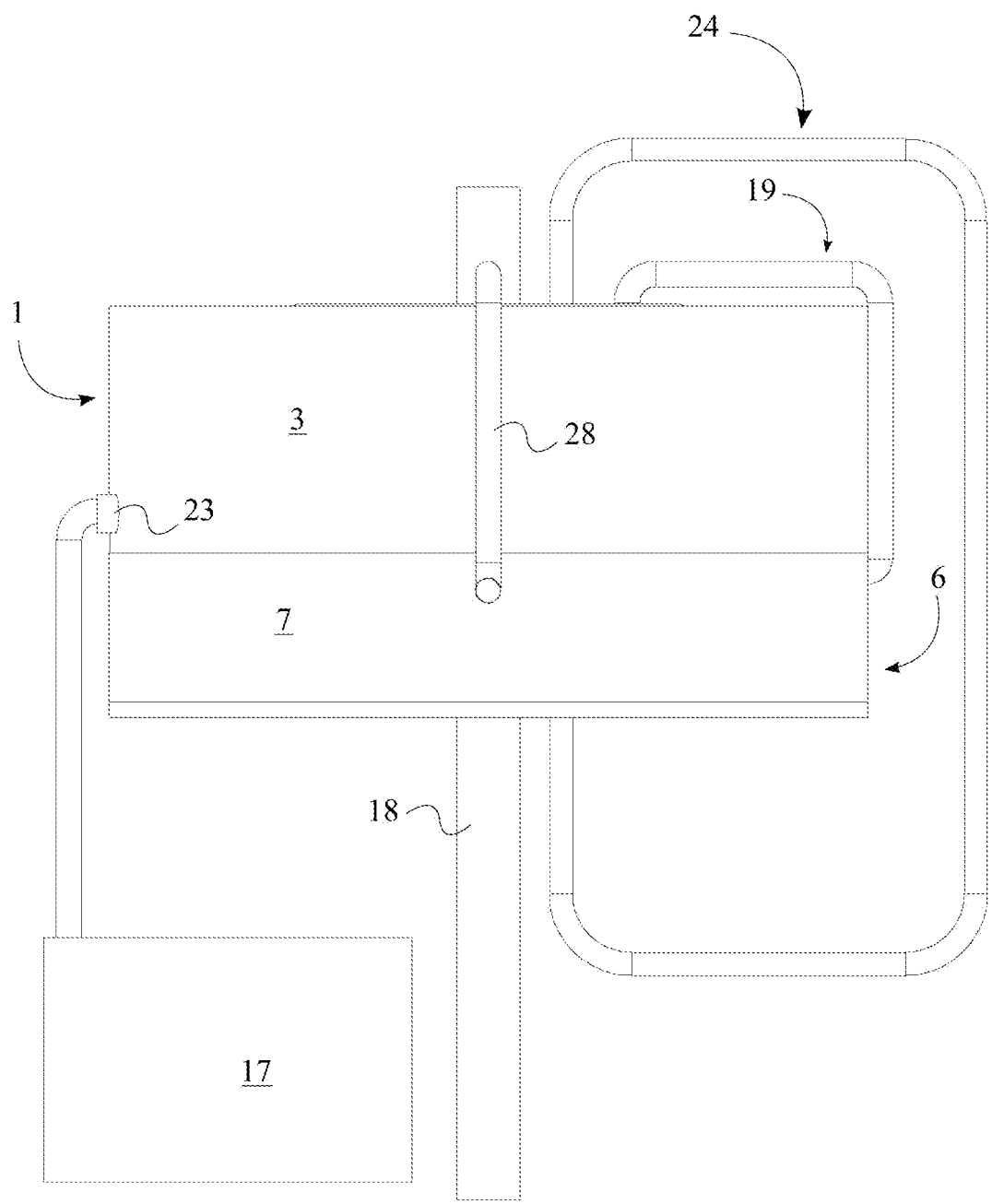
FIG. 2 is a side view of the present invention.

As seen in FIG. 1 and FIG. 2, the present invention comprises a centrifugal unit 1, a cavitation unit 6, a cooling condenser 17, a vertical shaft 18, and a pitot tube 19. The centrifugal unit 1 is used to remove heavy solids from a water sample at an initial stage of the water purification process. When heavy solids are removed from the water sample, the pitot tube 19 transfers a clear water sample to the cavitation unit 6 which then utilizes heat generated from friction to produce phase change in the clear water sample. The rotational movements used for separating heavy solids from the water sample and the rotational movements which result in producing heat are initiated via the rotational motion of the vertical shaft 18. To do so, the centrifugal unit 1 and the cavitation unit 6 are mounted onto the vertical shaft 18. Preferably, the vertical shaft 18 is made of stainless steel and is powered by a vertical shaft engine or motor.

In the preferred embodiment of the present invention, the centrifugal unit 1 is positioned atop the cavitation unit 6 as shown in FIG. 2. Moreover, the centrifugal unit 1 is in fluid communication with the cavitation unit 6 via the pitot tube 19. When phase change occurs at the cavitation unit 6, the resulting water vapor is transmitted to the cooling condenser 17. To do so, the cavitation unit 6 is in fluid communication with the cooling condenser 17 so that the cooling condenser 17 can use water vapor as an input to release purified water as an output.

Figure 3:
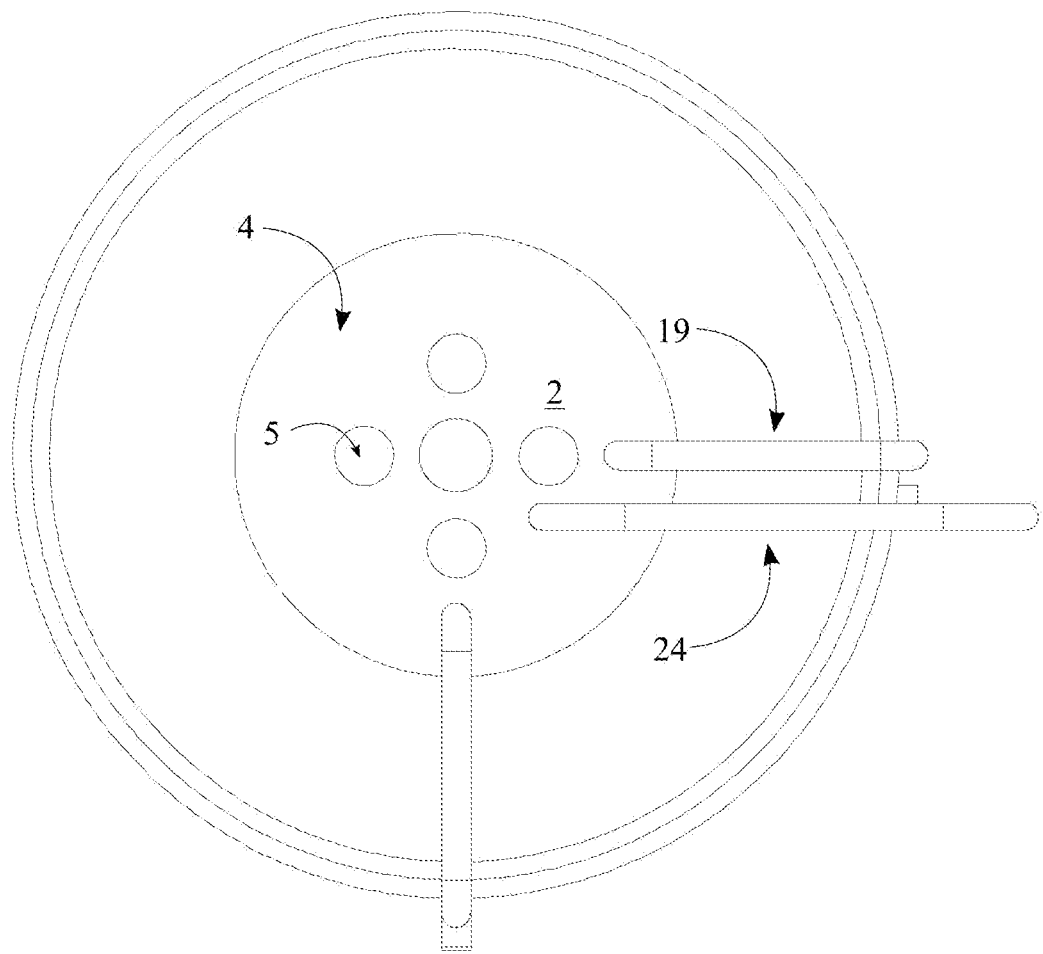
FIG. 3 is a top view of the present invention.
Figure 4:
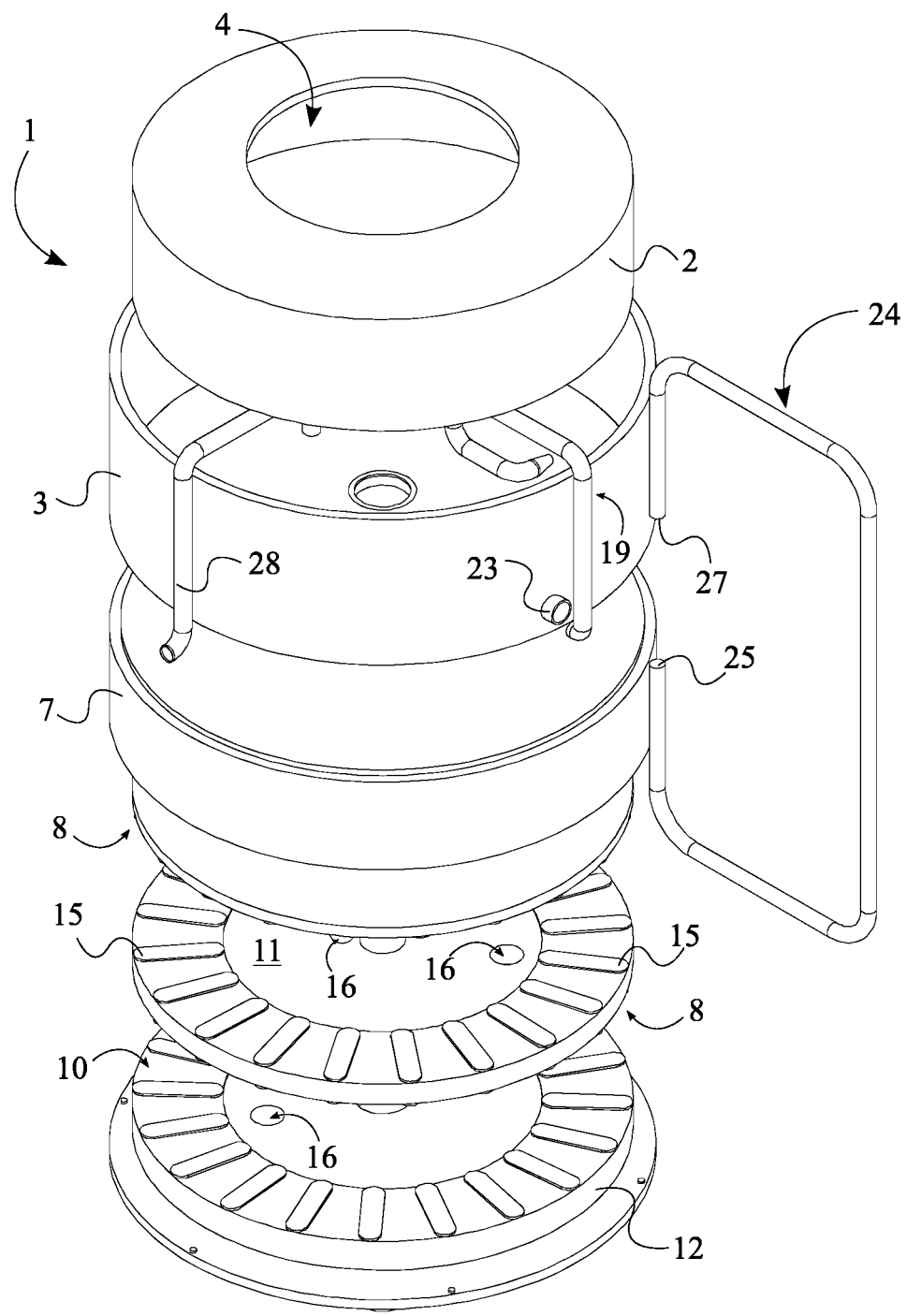
FIG. 4 is a perspective exploded view of the present invention.
Figure 5:
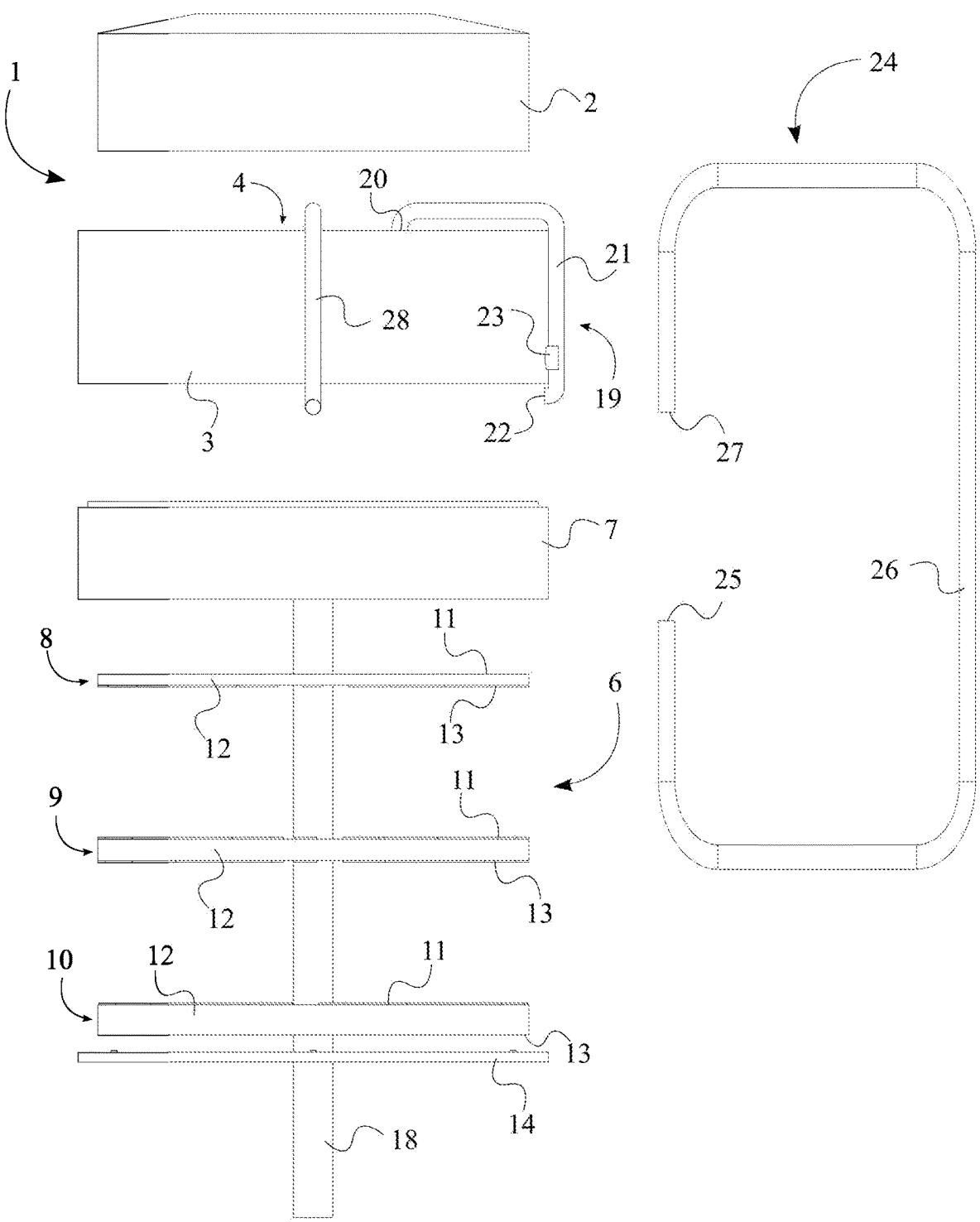
FIG. 5 is an exploded side view of the present invention.

A seen in FIGS. 3-5, the centrifugal unit 1 comprises a centrifuge rotor 2, a centrifuge chamber 3, a circular opening 4, and an exhaust port 5. The circular opening 4 centrally traverses into the centrifuge chamber 3 and provides an inlet for the water sample from a water source. The centrifuge rotor 2 is centrally positioned and rotatably mounted within the centrifuge chamber 3. The centrifuge rotor 2 provides the rotational motion that is used in separating the heavy solids from the water sample received from the water source. The present invention further comprises a fill tube 28 that transports water from the water source into the centrifugal unit 1. Preferably, the fill tube 28 extends out from the circular opening 4 and is in fluid communication with the water source. The water source can be, but is not limited to, a stream, a lake or a river. As mentioned before, the rotational motion of the centrifuge rotor 2 is controlled with the vertical shaft 18. To do so, the centrifuge rotor 2 is rotatably mounted onto the vertical shaft 18 so that an overall rotational motion of the centrifuge rotor 2 can be adjusted via the overall rotational motion of the vertical shaft 18. The positioning of the centrifuge rotor 2 ensures that the heavy solids from the water sample are contained within the centrifugal unit 1 by the centrifuge chamber 3. In particular, when the centrifuge rotor 2 is in motion, the heavy solids are pushed towards an inner lateral wall of the centrifuge chamber 3. Simultaneously, a less contaminated volume of water accumulates at the center of the centrifugal unit 1. The exhaust port 5, which is in fluid communication with the centrifuge rotor 2 and traverses into the centrifuge chamber 3, ensures that the water level within the centrifugal unit 1 is stabilized.

The pitot tube 19 is used to transmit the less contaminated volume of water to the cavitation unit 6. As seen in FIG. 5, to do so, the pitot tube 19 comprises a first end 20, a tube body 21, and a second end 22. The tube body 21 extends from the first end 20 to the second end 22 and determines an overall length of the pitot tube 19. The length of the pitot tube 19 can vary in different embodiments of the present invention. To extract water from the center of the centrifugal unit 1, the first end 20 of the pitot tube 19 is peripherally positioned into the circular opening 4. When the water is extracted, the tube body 21 carries the less contaminated volume of water which is then released into the cavitation unit 6 through the second end 22 of the pitot tube 19.

Figure 6:
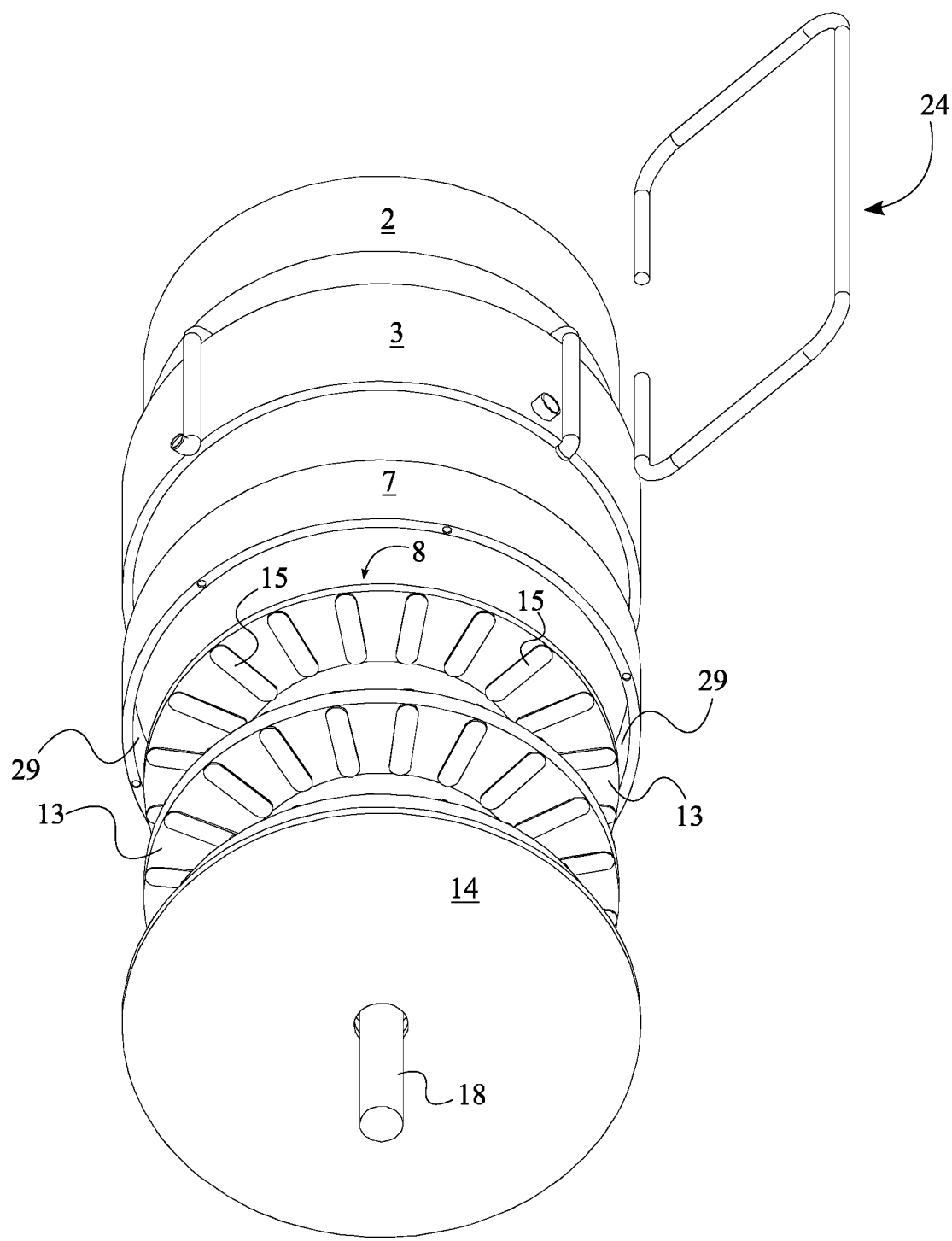
FIG. 6 is a bottom perspective exploded view of the present invention.

The cavitation unit 6 generates water vapor by utilizing heat generated from friction. Preferably, the temperature of the cavitation unit 6 will rise to a temperature of 216-degrees Fahrenheit or above. As seen in FIG. 5 and FIG. 6, the cavitation unit 6 comprises a holding chamber 7, a first heater plate 8, an intermediate heater plate 9, a last heater plate 10, and a cover plate 14. The holding chamber 7 and the cover plate 14 are used to enclose the first heater plate 8, the intermediate heater plate 9, and the last heater plate 10. The first heater plate 8 and the last heater plate 10 are identical. When considering the arrangement of the cavitation unit 6, the holding chamber 7, the first heater plate 8, the intermediate heater plate 9, the last heater plate 10, and the cover plate 14 are concentrically aligned to each other. The intermediate heater plate 9 is rotatably mounted onto the vertical shaft 18 in between the first heater plate 8 and the last heater plate 10. To create friction between the first heater plate 8 and the intermediate heater plate 9, the first heater plate 8 is connected to an inner lateral wall 29 of the holding chamber 7. Similarly, to create friction between the intermediate heater plate 9 and the last heater plate 10, the last heater plate 10 is connected to the inner lateral wall 29 of the holding chamber 7 opposite to the first heater plate 8. To create rotational movement in the intermediate heater plate 9, the vertical shaft 18 axially traverses through the holding chamber 7, the first heater plate 8, the intermediate heater plate 9, the last heater plate 10, and the cover plate 14. The positioning of the intermediate heater plate 9 creates a first receiving area between the first heater plate 8 and the intermediate heater plate 9. Moreover, a second receiving area is created in between the intermediate heater plate 9 and the last heater plate 10. The second end 22 of the pitot tube 19 is received at the second receiving area in between the last heater plate 10 and the intermediate heater plate 9.

As illustrated in FIG. 4 and FIG. 6, the first heater plate 8, the intermediate heater plate 9, and the last heater plate 10 further comprises a plurality of ridges 15 and a plurality of openings 16 that are used to accomplish phase change. More specifically, the plurality of ridges 15 helps create friction between the first heater plate 8, the intermediate heater plate 9, and the last heater plate 10 creating heat required for phase change. On the other hand, the plurality of openings 16, which traverses through the first heater plate 8, the intermediate heater plate 9, and the last heater plate 10, function as an outlet for the water vapor resulting from the phase change.

As shown in FIG. 5, to generate the necessary friction that results in phase change, the first heater plate 8, the intermediate heater plate 9, and the last heater plate 10 each comprise a top surface 11, a plate body 12, and a bottom surface 13. The plate body 12 extends from the top surface 11 to the bottom surface 13 and determines the overall thickness of the first heater plate 8, the intermediate heater plate 9, or the last heater plate 10. The plurality of ridges 15 of the first heater plate 8 is perimetrically and equidistantly distributed along the bottom surface 13 of the first heater plate 8. Similarly, the plurality of ridges 15 of the second heater plate 10 is perimetrically and equidistantly distributed along the top surface 11 of the last heater plate 10. To correspond with the plurality of ridges 15 of the first heater plate 8 and the last heater plate 10, the plurality of ridges 15 of the intermediate heater plate 9 is also perimetrically and equidistantly distributed along the top surface 11 and the bottom surface 13 of the intermediate heater plate 9.

The second end 22 of the pitot tube 19 is positioned such that the second end 22 releases the less contaminated volume of water in between the last heater plate 10 and the intermediate heater plate 9. The rotation of the intermediate heater plate 9 against the last heater plate 10 which is static, creates friction between the intermediate heater plate 9 and the last heater plate 10. The friction leads to a rise in temperature of the less contaminated volume of water trapped in between the intermediate heater plate 9 and the last heater plate 10. As the temperature rises, a mixture of heated water and water vapor is pushed towards the first receiving area in between the first heater plate 8 and the intermediate heater plate 9. Since the intermediate heater plate 9 is rotating against the first heater plate 8 which is static, heat is generated resulting in a volume of water vapor. To maintain the water flow within the cavitation unit 6, the present invention further comprises an equalizer tube 24 which extends from the cavitation unit 6 to the centrifugal unit 1. As seen in FIG. 5, the equalizer tube 24 comprises a first end 25, a tube body 26, and a second end 27, where the tube body 26 extends from the first end 25 to the second end 27. To maintain circulation by extracting water from the cavitation unit 6, the first end 25 of the equalizer tube 24 traverses into the cover plate 14 adjacent the last heater plate 10. On the other hand, the second end 27 of the equalizer tube 24 is positioned adjacent the circular opening 4 so that the water is released back into the centrifugal unit 1.

The volume of water vapor, which is ultimately used for producing purified water, rises within the present invention via the plurality of openings 16. To utilize the water vapor produced at the cavitation unit 6, the present invention further comprises a vapor discharge port 23 that directs the water vapor into the cooling condenser 17. Preferably, the vapor discharge port 23 will traverse into the holding chamber 7. However, the vapor discharge port 23 can be positioned differently in other embodiments of the present invention as long as the overall functionality remains the same. In general, the vapor discharge port 23 ensures that the cavitation unit 6 and the cooling condenser 17 are in gaseous communication with each other. The cooling condenser 17 receives the water vapor as an input, executes a cooling process, and outputs purified water.

Although the invention has been explained in relation to its preferred embodiment, it is to be understood that many other possible modifications and variations can be made without departing from the spirit and scope of the invention as hereinafter claimed.

What is claimed is:
1. A water purification system comprising:
a centrifugal unit;
a cavitation unit;
a cooling condenser;
a vertical shaft;
a pitot tube; the centrifugal unit being positioned atop the cavitation unit;
the centrifugal unit and the cavitation unit being mounted along the vertical shaft;
the centrifugal unit being in fluid communication with the cavitation unit via the pitot tube; and
the cavitation unit being in fluid communication with the cooling condenser.

2. The water purification system in claim 1 wherein:
the centrifugal unit comprises a centrifuge rotor, a centrifuge chamber, a circular opening, and an exhaust port;
the circular opening centrally traversing into the centrifuge chamber;
the centrifuge rotor being centrally positioned within the centrifuge chamber; the centrifuge rotor being rotatably mounted onto the vertical shaft;
the exhaust port traversing into the centrifuge chamber; and
the exhaust port being in fluid communication with the centrifuge rotor.

3. The water purification system in claim 1 wherein:
the cavitation unit comprises a holding chamber, a first heater plate, an intermediate heater plate, a last heater plate, and a cover plate;
the holding chamber, the first heater plate, the intermediate heater plate, the last heater plate, and the cover plate being concentrically aligned to each other;
the vertical shaft axially traversing through the holding chamber, the first heater plate, the intermediate heater plate, the last heater plate, and the cover plate;
the first heater plate, the intermediate heater plate, and the last heater plate being enclosed with the holding chamber;
the intermediate heater plate being rotatably mounted onto the vertical shaft in between the first heater plate and the last heater plate; and
the first heater plate and the last heater plate being connected to an internal lateral wall of the holding chamber.

4. The water purification system in claim 3, wherein the first heater plate is identical to the last heater plate.

5. The water purification system in claim 3 wherein:
the first heater plate, the intermediate heater plate, and the last heater plate each comprise a plurality of ridges, a plurality of openings, a top surface, a plate body, and a bottom surface;
the plate body extending from the top surface to the bottom surface;
the plurality of ridges being perimetrically and equidistantly distributed along the bottom surface of the first heater plate;
the plurality of ridges being perimetrically and equidistantly distributed along the top surface and the bottom surface of the intermediate heater plate;
the plurality of ridges being perimetrically and equidistantly distributed along the top surface of the last heater plate; and
the plurality of openings traversing through the first heater plate, the intermediate heater plate, and the last heater plate.

6. The water purification system in claim 3 further comprising:
a vapor discharge port;
the vapor discharge port traversing into the holding chamber of the cavitation unit.

7. The water purification system in claim 1 wherein:
the pitot tube comprises a first end, a tube body, and a second end;
the tube body extending from the first end to the second end;
the first end of the pitot tube being peripherally positioned into a circular opening; and
the second end of the pitot tube traversing into the cavitation unit and positioned between a last heater plate and an intermediate heater plate.

8. The water purification in claim 1 further comprising:
an equalizer tube; the equalizer tube comprises a first end, a tube body, and a second end;
the tube body extending from the first end to the second end;
the first end of the equalizer tube traversing into a cover plate;
the second end of the equalizer tube being positioned into a circular opening of the centrifugal unit; and
the equalizer tube extending from the cavitation unit to the centrifugal unit.

9. The water purification system in claim 1 further comprising:
a fill tube;
the fill tube extending outwards from a circular opening of the centrifugal unit.

* * * * *